E. P. Willets,
Whip Rack.
N° 64,610.                               Patented May 7, 1867.
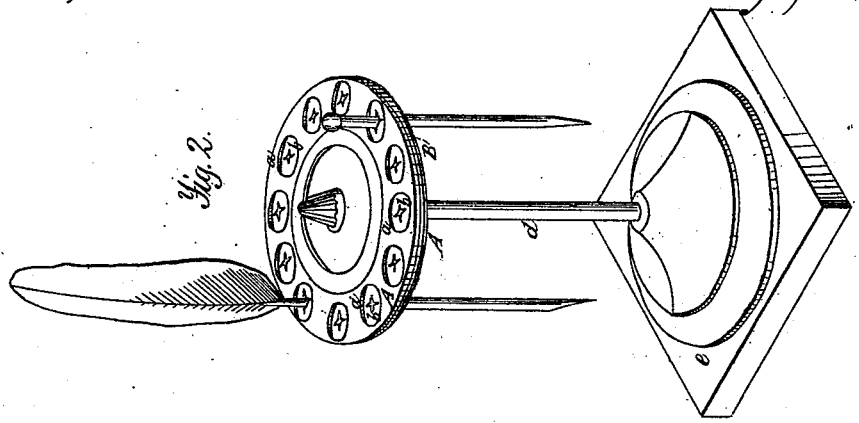
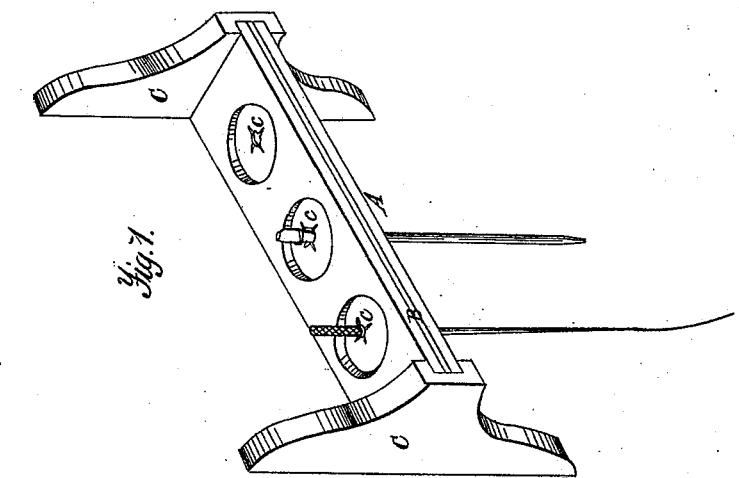
Witnesses.
M Bailey
Chas G Page Jr
E P Willets by
Inventor.
A Pollok
his atty.

United States Patent Office.

E. P. WILLETS, OF NORTH HEMPSTEAD, NEW YORK, ASSIGNOR TO EDWARD RICHMOND.

Letters Patent No. 64,610, dated May 7, 1867.

IMPROVED RACK FOR WHIPS.

The Schedule referred to in these Letters Patent and making part of the same.

TO WHOM IT MAY CONCERN:

Be it known that I, E. P. WILLETS, of North Hempstead, in the county of Queens, and State of New York, have invented certain new and useful improvements in Racks for Holding Whips and other articles; and I hereby declare the following to be a full, clear, and exact description of the same, reference being had to the accompanying drawings, in which—

Figures 1 and 2 represent perspective views of two forms of my improved rack.

The object of my invention is to provide a rack in which whips, canes, brooms, pens, and other like articles may be readily placed and tightly held, at the same time that they may with equal facility be removed from the rack whenever necessary. Some article of this kind for general household purposes is almost indispensable, as is proved by the numerous varieties of racks now in use. Numerous, however, as they are, there are none, to my knowledge, in which the object to be kept in place is held by an elastic or yielding pressure which will retain it firmly in position, and yet admit of its being removed from or placed in the rack with perfect facility. This is the main feature of my invention, and one which enables me to place in the rack without trouble any article —as, for instance, a broom, cane, or whip—which may, by means of the pressure or binding power of the elastic substance employed, be suspended from either of its ends, or from any point between its ends. My invention essentially consists in a rack formed by the combination, with one or more plates of wood, or other material, in which suitable perforations or orifices are formed, of a like perforated sheet, or rubber, or other elastic substance, applied to the said plates in such manner that the article to be suspended from the rack, when inserted through the orifices in the plates, shall be encircled and held by the elastic substance. The rack should, preferably, be formed of two plates, between which is interposed a sheet of vulcanized rubber. The orifices formed in the plates are of considerable size, so as to allow the butt of the whip, or the handle of a broom, or other article, to pass through them. The perforation in the elastic substance is, however, made smaller, for it is thereby enabled to grasp smaller articles, while, at the same time, its extensible nature allows it to adapt itself to those of larger size. To facilitate this I form small slits in the rubber, radiating from the centre of each orifice, which permit the rubber to yield with greater facility. A rack of this kind may be made of any size and for any purpose for which racks are ordinarily used. In the drawings I have shown two forms of the rack, one adapted for ordinary purposes, the other being smaller and intended to serve as a pen-rack.

In fig. 1 the rack is composed of two rectangular plates, A A, of wood, metal, or other suitable material, between which there is interposed a sheet of vulcanized rubber, B. The plates have circular orifices $a$ of the desired size formed in them, and there are similar but smaller perforations $b$ made in rubber concentrically with the orifices $a$. For the purpose of facilitating the insertion or withdrawal of the handle of the article to be suspended, each orifice $b$ has radial slits $c$, which enable the rubber to yield with greater facility, while, at the same time, they do not sensibly lessen its power to grasp and hold the article inserted through the hole. The rack is supported in brackets C, which may be secured to the wall at any desired height from the floor. In using the rack for holding whips it needs to be placed some distance above the ground, so that when the butt, by which the whip is suspended, is forced up through the orifices $a$ and $b$, the tip or lash may clear the floor. In this way the whip can be kept straight, and its top is prevented from bending over and getting out of shape. Canes, brooms, billiard cues, and all other like articles can, of course, be held in the rack with as much facility as whips. In fig. 2 I have shown a modified form of the rack, which may be used to advantage as a pen and pencil-rack. It is like the rack in fig. 1, composed of two plates of wood or metal, with an interposed sheet of rubber. The form of the plates, however, is circular, and they are supported by a rod or upright piece, $d$, the lower end of which is attached to a base, $e$, which rests upon the table or other stand upon which the rack is placed. The pens or other articles to be placed in the rack are held in the orifices $a$ $b$, &c., formed near the circumference of the plates. The plates A may be formed of metal or other suitable material as well as of wood, and the whole rack may be ornamented and made of any desired shape or pattern. It will be seen that the rubber is tightly held and compressed between the plates at all points, save where it stretches over the orifices $a$. The same effect in a degree may be produced by using the rubber with a single plate, the rubber in this case being tacked down or otherwise suitably secured around the orifice $a$.

While, therefore, describing what I consider to be the best means for giving effect to my invention, I do not limit myself exclusively to those means; but what I claim, and desire to secure by Letters Patent, is, as a new article of manufacture—

1. A rack for holding and suspending whips and other articles, consisting of one or more plates of wood, or other suitable material, in which a series of orifices or perforations is formed, combined with a correspondingly perforated sheet of rubber, or other elastic substance, in the manner and for the purposes herein set forth.

2. In a rack for suspending whips and other articles as described, I claim the combination, with the perforated plates of wood, or other suitable material, of a perforated sheet of vulcanized rubber, or other elastic substance, interposed between the said plates under the arrangement herein specified, so that the whip or other article, when inserted in the orifices formed in the plate, shall be held by the elastic substance, substantially as set forth.

In testimony whereof I have signed my name to this specification before two subscribing witnesses.

E. P. WILLETS.

Witnesses:
    HENRY H. COX,
    HARRY COX.